(12) United States Patent
Chapuis

(10) Patent No.: US 6,424,361 B1
(45) Date of Patent: *Jul. 23, 2002

(54) METHOD OF NAVIGATING IN A GRAPHICAL USER INTERFACE AND DEVICE FOR IMPLEMENTING THE SAME

(75) Inventor: Laurent Chapuis, Paris (FR)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,443

(22) Filed: Aug. 8, 1997

(30) Foreign Application Priority Data

Aug. 12, 1996 (FR) ............................................. 96 10129

(51) Int. Cl.[7] ................................................ G06F 3/00
(52) U.S. Cl. ........................................ 345/854; 725/52
(58) Field of Search ................................ 345/339, 327, 345/348, 352, 353, 354, 356, 357, 145, 146, 157, 160, 700, 716, 719–720, 764, 810, 817–819, 821, 823, 829, 835, 840–841, 853–854, 856–857, 156; 348/569, 906, 7, 12, 13; 725/37, 52

(56) References Cited

U.S. PATENT DOCUMENTS

| | | | |
|---|---|---|---|
| 5,425,140 A | 6/1995 | Bloomfield et al. | 345/841 |
| 5,510,811 A * | 4/1996 | Tobey et al. | 345/157 |
| 5,583,560 A * | 12/1996 | Florin et al. | 725/40 |
| 5,585,866 A * | 12/1996 | Miller et al. | 725/43 |
| 5,606,654 A * | 2/1997 | Schuur | 345/440 |
| 5,621,905 A * | 4/1997 | Jewson et al. | 345/841 |
| 5,677,708 A * | 10/1997 | Matthews, III et al. | 345/684 |
| 5,682,511 A * | 10/1997 | Sposato et al. | 345/716 |
| 5,812,134 A * | 9/1998 | Pooser et al. | 345/848 |
| 6,005,578 A * | 12/1999 | Cole | 345/854 |

FOREIGN PATENT DOCUMENTS

| | | |
|---|---|---|
| EP | 0 476 842 A2 | 3/1992 |
| GB | 2 274 447 A | 4/1994 |
| WO | WO 95/01058 A1 | 1/1995 |

OTHER PUBLICATIONS

IBM Technical Disclosure Bulletin, "Selecting Nodes in a Hierarchial Graph using the Keyboard" 7/94, vol. 37, No. 7, pp. 151–156.

IBM Technical Disclosure Bulletin, "Integrated Audio—Graphics User Interface", 4/91, vol. 33, No. 11, pp. 368–371.

Copy of French Search Report.

* cited by examiner

Primary Examiner—Crescelle N. dela Torre
(74) Attorney, Agent, or Firm—Joseph S. Tripoli; Robert D. Shedd; Frank Y. Liao

(57) ABSTRACT

A method of navigating in a graphical user interface is presented. This method is characterized in that it comprises the stages:

of displaying graphical elements which can be selected using a cursor, of connecting at least two of said graphical elements using linear segments, a first and a second element being connected by a single link composed of one or more segments placed in series, of shifting the cursor from a first element to a second element, when the direction key of a control means (11) corresponding uniquely to the orientation of the segment connected at the point of departure from the first element is pressed, there being at most one segment having an orientation corresponding to a given direction key connected to a given element.

The invention also relates to a device for implementing the method.

11 Claims, 4 Drawing Sheets

METHOD OF NAVIGATING IN A GRAPHICAL USER INTERFACE AND DEVICE FOR IMPLEMENTING THE SAME

FIELD OF INVENTION

The invention relates to a method of navigating in a graphical user interface, particularly in the context of a device for receiving or viewing digital television. The invention also relates to a device for implementing this method.

BACKGROUND OF THE INVENTION

In step with the evolution of the functions of audio-visual apparatus and of the services offered by this medium, the development of effective interfaces between this apparatus and the users becomes a crucial problem. This type of interface, intended for what are essentially consumer products, needs to be simple while giving access to the available services and functions in a rapid and intuitive way. Moreover, the constraints relating to the control devices have to be taken into account. Whereas, in the past, remote controls had a tendency to become ever more complex with a proliferation of buttons, the complexity is transferred to the user interface, whether graphical or not, controlled by the use of a remote control which is in itself fairly simple. As a consequence, the principles of navigation in the menus and through the tree structure of these menus must allow the use of relatively simple remote controls, which can be a restraint on the flexibility of the user interface.

BRIEF SUMMARY OF THE INVENTION

The subject of the invention is a method of navigating in a graphical user interface, characterized in that it comprises the stages:

of displaying graphical elements which can be selected using a cursor, of connecting at least two of said graphical elements using linear segments, a first and a second element being connected by a single link composed of one or more segments placed in series, of shifting the cursor from a first element to a second element, when the direction key of a control means corresponding uniquely to the orientation of the segment connected at the point of departure from the first element is pressed, there being at most one segment having an orientation corresponding to a given direction key connected to a given element.

According to one particular embodiment, more than two segments linked end-to-end link two elements, forming a broken line.

According to one particular embodiment, the user interface includes a list of elements forming a set having common functional characteristics, the cursor being shifted within said set by using two opposite direction keys, a third element being attached to said set by at least one linear segment the orientation of which at the point of departure from said set is such that it allows the cursor to be shifted from said set towards said third element using one of the two direction keys used for navigation within the set when said element possesses the same functional characteristics as the elements of the set and such that it allows the cursor to be shifted from said set towards said third element using a direction key other than the two keys already used when this is not the case.

According to one particular embodiment, a group of graphical elements linked by linear segments forms a chain, said group including elements used in several screens of said interface, said group being placed at an identical site in each of said screens.

According to one particular embodiment, the linear segment at the point of departure from a fourth element of one of said screens towards said group of elements has an orientation which changes from screen to screen depending on the functional characteristics of said fourth element.

According to one particular embodiment, when an element is linked to a list of elements, it is linked, as appropriate, to the selected element of this list.

According to one particular embodiment said linear segment is a segment of line.

According to one particular embodiment, two elements are connected via a bend consisting of at least two perpendicular linear segments of different directions connected in series.

A further subject of the invention is a digital television receiving device including a graphical user interface and comprising means for control of said interface, said control means including means for indicating a direction, characterized in that said interface includes:

a cursor, graphical elements which can be selected using said cursor, at least two of said graphical elements being linked by the use of linear segments, a first and second element being connected by a single link composed of one or more segments connected in series, said cursor being apt to be shifted from a first element towards a second element when a direction corresponding to the orientation of the segment at the point of departure from the first element is indicated by the use of said control means, there being at most one segment having an orientation corresponding to a given direction connected to a given element.

BRIEF DESCRIPTION OF THE DRAWINGS

Further characteristics of the invention will emerge via the description of a particular non-limiting exemplary embodiment illustrated by the figures, among which.

DETAILED DESCRIPTION OF THE INVENTION

It should be mentioned that, for further information on the MPEG and DVB tables and sections, format and content of the service data, reference may be made in particular to the following three documents:

(a) ETS 300 468—Specification for Service Information (SI) in Digital Video Broadcast (DVB) systems—Jan. 23, 1996, (b) ISO/IEC 13818-1 (1994) Generic Coding of Moving Pictures and Associated Audio—Recommendation H.220, also called "MPEG II Systems" and (c) ETR 211—Digital Broadcasting systems for television: Implementation guidelines for the use of MPEG-2 systems; Guidelines on implementation and usage of service information.

Figure 1:
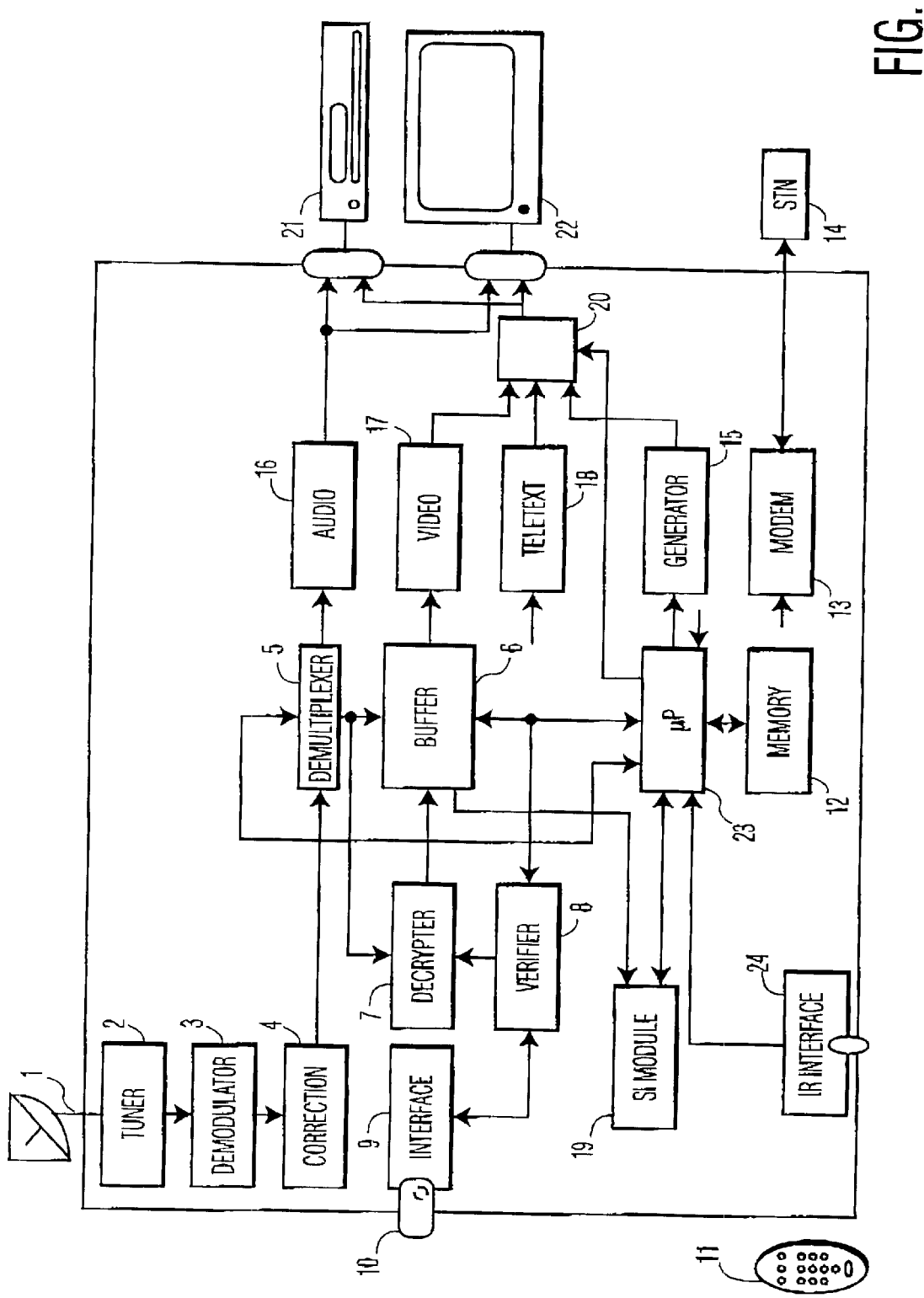
FIG. 1 is a block diagram of a digital television receiver implementing the exemplary embodiment.

FIG. 1 is a block diagram of a digital television integrated decoder-receiver of DVB (Digital Video Broadcasting) type.

It is quite clear that the invention is not limited to this physical environment, but can easily be adapted to another type of service data transmission, such as, for example, a transmission of teletext type in certain lines of the frame flyback interval of an analogue television signal.

The decoder of FIG. 1 is linked to an antenna 1, itself linked to a tuner 2 of the decoder. The signal supplied by the tuner is demodulated by a demodulator 3. The demodulated data are corrected by a corrector circuit 4 and sent on to a demultiplexer 5.

The demultiplexer 5 includes a certain number of filters programmed by a microprocessor 23 depending on the various applications supported by the decoder. For the sake of clarity in the drawing, only the most important connections of the microprocessor 23 are illustrated.

The audio or video packets or sections filtered by the demultiplexer are stored in predefined areas of a buffer memory 6 for the attention of these applications. If necessary, the information is first of all decrypted by a decrypter circuit 7 depending on the rights of the user, before being stored in this buffer memory 6.

According to the present example, the applications are five in number: an audio decoder 16, a video decoder 17, a Teletext decoder 18, an access control assembly (comprising the decrypter 7, a verification microcontroller 8 and a smart card interface 9 linked in normal operating mode to a smart card 10), as well as a service data management module 19.

The decoder also includes an infrared interface 24 for a remote control 11, said interface also being linked to the microprocessor 23. The latter is connected to a memory 12 including the operating system as well as the resident or downloaded programmes for running the applications.

A modem 13 linked to the switched telephone network 14 is also controlled by the microprocessor.

A character generator 15 allows generation of graphics or control menus relating to the parameters of the decoder or to a specific application. The video signal generated by this character generator is multiplexed with one of the video signals originating from the video decoder 17 or from the teletext decoder 18 to a first Peritel socket (SCART socket in English) linked to a television set 22 or a second Péritel socket linked to a video recorder 21. The multiplexing circuit 20 is managed by the microprocessor 23.

The service data management module 19 manages the service information available in the digital data stream and maintains an internal database featuring information which is important, renewable by updating or frequently used. This management module is the subject of other patent applications in the name of the present applicant. Although represented as independent, this module may be a program managed by the microprocessor 23 and stored in the memory 12.

The remote control 11 particularly includes:
four direction keys,
a validation key,
a numerical keypad,
a "return" key,
two "Programme+" and "Programme−" keys,
two "Volume+" and "Volume−" keys,
an "On/off" key,
a "Guide" key,
a "Return" key, and an "Info" key.

The microprocessor 23 also manages an interface which represents the interface between the user and the applications of the decoder. This interface particularly gives access to a guide to programmes, pay services and menus for setting up and programming certain functions of the decoder.

Figure 2:
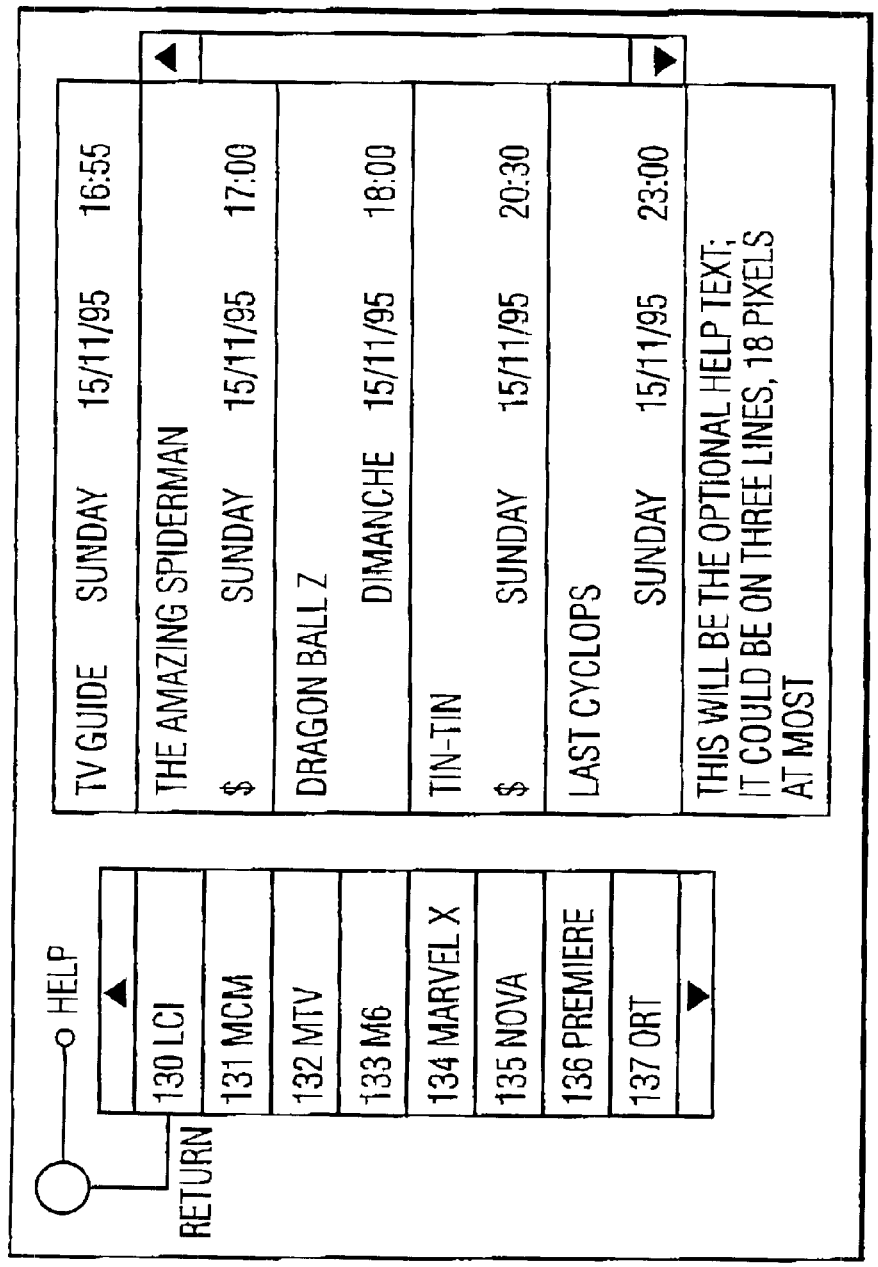
FIG. 2 represents a first screen of a user interface of the digital television receiver of FIG. 1, said screen featuring a guide to services.

FIG. 2 represents one screen of the programme guide, this particular screen being the "guide to services" enabling the programmes (called events) to be scrolled for each of the TV channels (called services).

This screen features a list of eight services, placed on the left of the screen. Each service is identified by a service number and its name. Up and down arrows, placed respectively above and below the list, indicate the options for scrolling the services in increasing or decreasing order of service number. This scrolling is performed by selecting the first or last service of the list using the "up" and "down" direction keys and continuing to press these keys.

The screen also includes, over about the right two-thirds, an area for displaying information relating to events which are broadcast by the activated service of the list of services. This part of the screen is also organized in a vertical layout and allows scrolling similar to that of the list of services. The scrolling options are indicated by virtue of a vertical bar placed adjacent to the right-hand side of the display area. The arrow or arrows disappear if the limits of the list of events are reached. This is also true for the arrows of the list of services.

The display area allows the information relating to four events to be presented. It also includes, in its upper part, a line intended to repeat the title of the current application ("TV Guide" in the present case) and an indication of the date and time, with the aim of giving the user a navigation marker. Three lines at the bottom of the screen are dedicated to any user help text.

Movement throughout the screen as a whole is performed essentially by virtue of the direction keys of the remote control. A distinction will be made between the notion of selection, which consists in placing the cursor on an element, and the notion of activation, which consists in performing an action on this element.

For example, in order to obtain the list of events relating to a particular service, the user must firstly select a service by placing the cursor on this service, then activate this service by pressing the validation key. It is only at this instant that the application updates the list of events.

The invention relates more particularly to the link between various elements. The lists of services and of events are organized in the form of superimposed rectangles, which naturally indicates to the user that he can move within each list by virtue of the "up" and "down" direction arrows. Horizontal navigation is implemented by virtue of the "left" and "right" arrows, which is indicated with the aid of the particular graphics associated with a selected element (change of colour and/or of brightness of the selected rectangle and association of an arrow with this rectangle).

However, there exist elements which are neither services nor events, and which cannot, a priori, be placed at the same level by way of being integrated purely and simply into one of the two abovementioned lists. In the context of FIG. 2, these are the "return" and "help" functions which make it possible to come back up from a level in the tree structure of a menu and to get help concerning the screen displayed.

With the maximum amount of space on the screen of FIG. 2 being allotted to the information proper, the "return" and "help" functions are not placed in what could be called a third area of the screen, and which would be governed by the same navigation principles (horizontal arrows for a change of area and vertical arrows for movement within each area).

Taking the place of a third vertically organized area, the "return" and "help" functions are illustrated by graphical representations (here "nodes") placed in a chain and linked by segments of line. The "return" function is linked to one of the elements of the list of services by a broken line. This line is horizontal starting from the element of the list, continues with a bend then a vertical segment so as to join up with the circle representing the "return" function, placed in the upper left corner of the screen. The legend "return" is placed along the vertical segment. Starting from this function, a horizontal line segment joins up with a second circle placed to the right of the first one and bearing the legend "help".

The segments of lines indicate to the user the way of navigating to and from functions (or elements, for that matter) linked by these segments, since, in the context of the present example, navigation to/from these functions departs from the general rule.

The "left" arrow has to be used in order to go from the list of services to the return function. In contrast, to return from the return function to the list of services, it is the "down" arrow which has to be employed.

Consequently, the key used to navigate from an element A to an element B is not necessarily the key which is the reverse of the one making it possible to go from element B to element A. This gives great freedom in the design of the interface, while maintaining intuitive navigation within this interface.

The use of broken lines makes it possible to indicate clearly to the user how navigation has to be performed, while giving the developer of graphical interfaces great flexibility as to the layout of the elements on a screen. The use of a bend formed from two segments is particularly advantageous for linking elements.

The "right" arrow has to be used to go from the "return" function to the "help" function, and the left arrow to return from the "help" function to the "return" function.

According to one variant embodiment, the link between a function and an element of a list links said function, as appropriate, to the selected element of that list.

Figure 3:
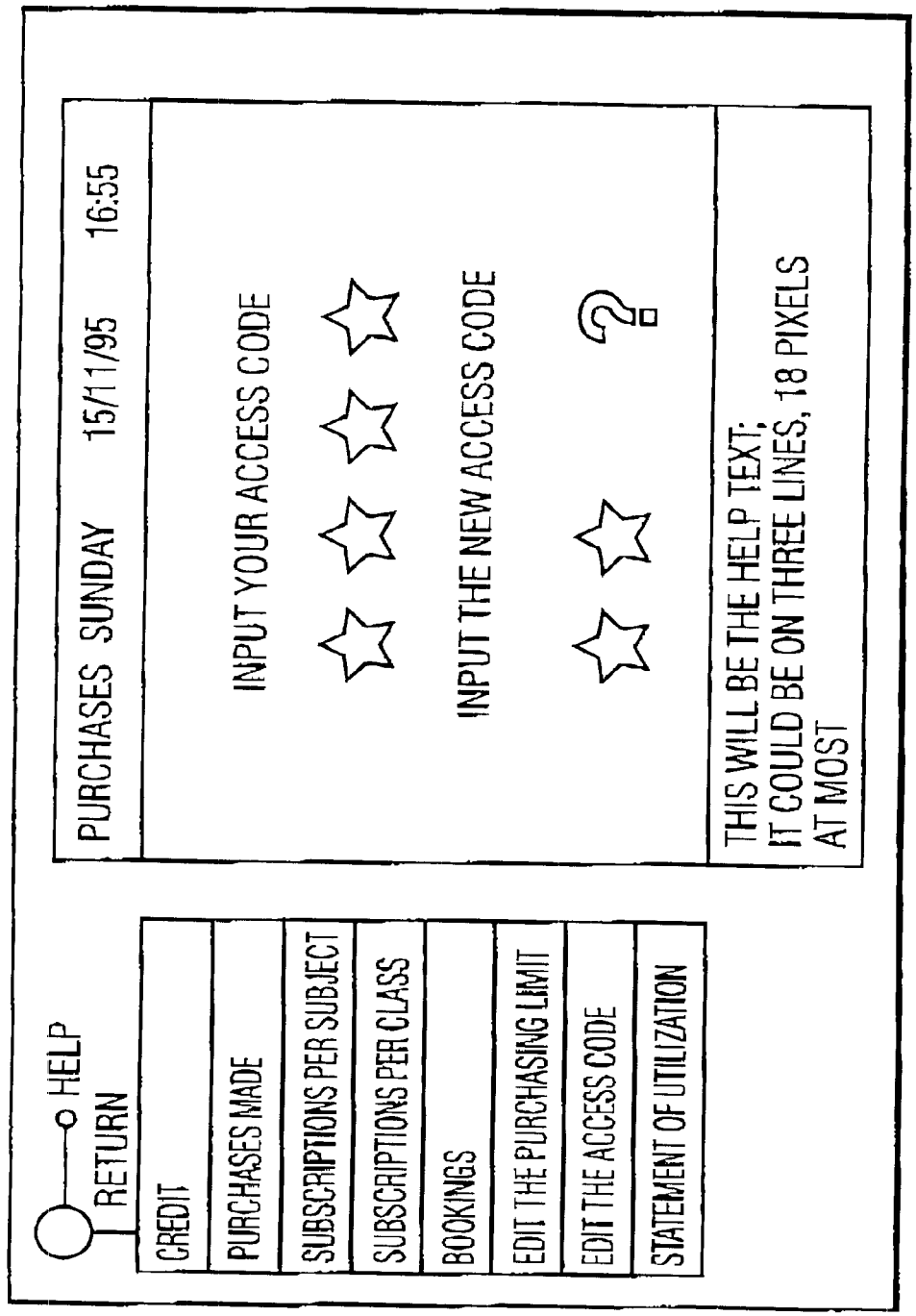
FIG. 3 represents a second screen of the user interface, featuring event purchasing functions.

FIG. 3 is the "Purchases" screen presented to the user for managing paying events and certain access codes. The layout of this screen repeats the principles of that of FIG. 2, with a display area occupying about the right two-thirds of the screen, and a list placed in the right third. This time, this list is a list of functions, in the same way as the return function. In this case, the latter is integrated into the list of functions by altering the point of attachment of the line which links it to this list. In this instance, this attachment is formed by a vertical line segment. The navigation principle for selecting a function from the list or for selecting the return function is therefore the same.

It will be noted that, advantageously, the "return" and "help" functions are always placed at the same site on the screen, so as not to disorient the user by presenting identical functions in a different way from screen to screen. It is for this reason also that, according to the present example, the "return" and "help" functions are never integrated into a list of functions in exactly the same way as the other elements of that list.

The use of the attachment by broken lines of variable length, depending on the content of the screens, allows this placing of the functions at the same site on each screen. This can be seen particularly by comparing FIG. 2 and FIG. 4.

Figure 4:
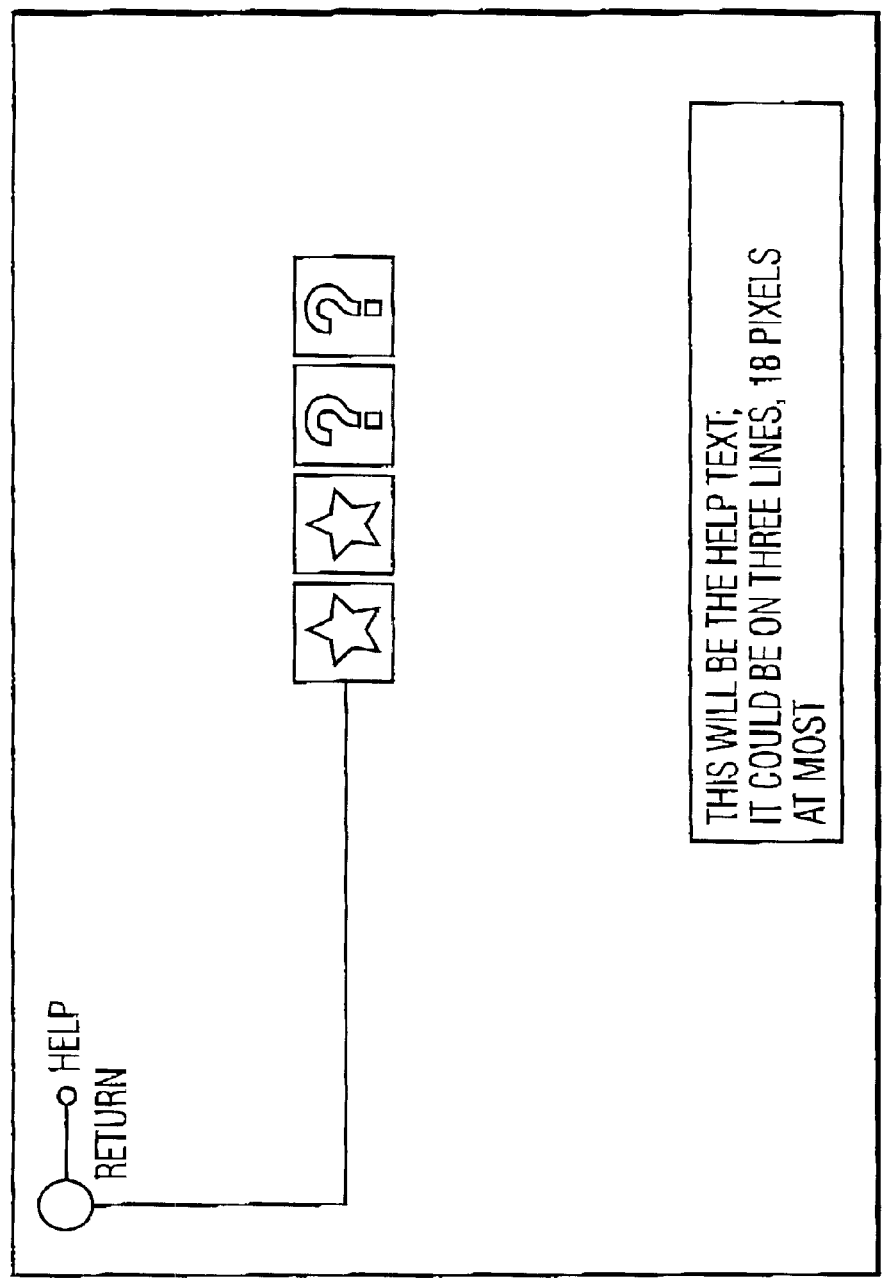
FIG. 4 represents a third screen of the user interface, intended for entering a confidential code.

FIG. 4 represents the screen presented to the user for entering a confidential code, for example the code for access to a particular service. The "return" and "help" functions are placed in exactly the same way as on the screens of FIGS. 2 and 3. The positions for the digits of the confidential code are placed in the middle of that part of the screen which, in FIGS. 2 and 3, contained the display area. The digits already entered are displayed in the form of a star, the remaining ones being in the form of a question mark. The digit selected by the cursor is distinguished by its higher brightness. A context-based help text is displayed at the bottom of the screen, in the three lines of the help area already described.

When this screen is displayed, the cursor is placed on the first of the four digits, and is shifted to the next digit to the right when a digit is entered. When the fourth digit is entered, the code is automatically validated and compared with the code recorded in the memory of the decoder or of the smart card.

The user may nevertheless chose to return to a previous screen or to alter one of the first three digits before entering the fourth, making use of the left arrow of the remote control.

The screen of FIG. 4 is not nearly as cluttered as that of FIG. 2. The line attaching the "return" function to the area for entering the digits of the code nevertheless allows the whole of the screen to be used.

It will be noted that the relationship between a direction key and the orientation of a segment at the point of departure from a graphical elements is a one-to-one relationship in the sense that the use of this key allows one and only one element to be selected from the starting element. In other words, there will never be two segments starting in the same direction attached to the same element. Neither will a segment branch towards several graphical elements, since this would also result in the same ambiguous situation.

Moreover, although the examples given in the present description and the corresponding drawings use linear segments, other attaching shapes could be employed, given that the directions of these attachments at the point of departure from each element can be fully identified and associated with one key of the remote control.

For example, the "return" function and the "LCI" event of FIG. 2 may be attached using a circular arc the tangents to which at the point of departure from the event and from the function are substantially the directions given by the two segments illustrated by FIG. 4.

The invention is not limited, moreover, to horizontal/vertical direction keys. Diagonal keys, for example, may also be used.

According to one variant embodiment, the remote control, or another control device capable of being situated directly on the apparatus, enables a direction to be indicated, particularly using a joystick or a ball.

It is quite obvious that the invention is not limited to the specific example which has just been described. In particular, elements, functions and events other than "return" and "help" may be implemented.

What is claimed is:

1. Method of navigating in a graphical user interface, comprising the steps of:
displaying graphical elements using linear segments, a first and a second element being connected by a single link composed of one or more segments placed in series, said first element and said second element being connected along one of a plurality of determined paths,
shifting the cursor from the first element to the second element, when a single direction key of a control means corresponding uniquely to the orientation of the segment connected at this point of departure of the link from the first element to the second element is pressed, there being a unique direction key associated with every segment departing from a given element, the unique direction key corresponding to a given segment at its departure from an element, so as to move said first element along one said one of said plurality of determined paths to said second element using said single direction key associated with said link.

2. Method according to claim 1, characterized in that more than two segments linked end-to-end link two elements, forming a broken line.

3. Method according to claim 1, characterized in that the user interface includes a list of elements forming a set having common functional characteristics, the cursor being shifted within said set by using two opposite direction keys, a third element being attached to said set by at least one linear segment the orientation of which at the point of departure from said set is such that it allows the cursor to be shifted from said set towards said third element using one of the two direction keys used for navigation within the set when said element possesses the same functional characteristics as the elements of the set and such that it allows the cursor to be shifted from said set towards said third element using a direction key other than the two keys already used when this is not the case.

4. Method according to claim 1, characterized in that a group of graphical elements linked by linear segments forms a chain, said group including elements used in several screens of said interface, said group being placed at an identical site in each of said screens.

5. Method according to claim 4, characterized in that the linear segment at the point of departure from a fourth element of one of said screens towards said group of elements has an orientation which changes from screen to screen depending on the functional characteristics of said fourth element.

6. Method according to claim 5, characterized in that when an element is linked to a list of elements, it is linked, as appropriate, to the selected element of this list.

7. Method according to claim 3, characterized in that said linear segment is a segment of line.

8. Method according to claim 7, characterized in that two elements are connected via a bend consisting of at least two perpendicular linear segments of different directions connected in series.

9. Method according to claim 1, wherein the orientation of a segment at the point of departure from the first element connected by at least two segments to the second element and the orientation of the segment at the point of departure from the second element towards the first element are such that the direction key used to move the cursor from the first element to the second element is not the reverse of the direction key used to move the cursor from the second element to the first element.

10. Digital television receiving device including a graphical user interface and comprising means for control of said interface, said control means for indicating a direction, characterized in that said interface includes:

a cursor;

graphical elements which can be selected using said cursor, at least two of said graphical elements being linked by the use of linear segments, a first and second element being connected by a single link composed of one or more segments connected in series, said first and second elements being connected along one of a plurality of determined paths, said cursor being apt to be shifted from a first element towards a second element when a direction corresponding to the orientation of the segment at the point of departure from the first element is indicated by the use of said control means, there being at most one segment having an orientation corresponding to a given direction connected to a given element, so as to move said first element along one of said determined paths to said second element along a link.

11. Method of navigation in a graphical user interface, comprising the steps of:

displaying graphical elements which can be selected using a cursor, connecting at least two of said graphical elements using segments, a first and a second element being connected by a single link composed of a plurality of segments placed in series, said first element and said second element being connected along one of a plurality of determined paths, shifting the cursor from the first element to the second element, when a single direction key of a control means corresponding uniquely to a first orientation identified by the segment connected at the point of departure from the first element is pressed, there being a second orientation identified by the segment connected at the point of departure from the second element, the orientations being such that the single direction key used to move the cursor from the first element to the second element is not in reverse of the single direction key used to move the cursor from the second element to the first element, there being a unique direction key associated with every segment departing from a given element, the unique direction key corresponding to a given segment being determined by the orientation of said given segment at its departure from an element, so as to move said first element along one of said plurality of determined paths to said second element using said single direction key associated with said link.

* * * * *